United States Patent Office 3,733,263
Patented May 15, 1973

---

3,733,263
WASTE TREATMENT SYSTEM
Mikkel G. Mandt, Neenah, Wis., assignor to Kimberly-Clark Corporation, Neenah, Wis.
Filed Mar. 1, 1971, Ser. No. 119,463
Int. Cl. C02c 1/06
U.S. Cl. 210—7
10 Claims

ABSTRACT OF THE DISCLOSURE

Compact waste treatment unit utilizing annular flow, positive mixing aeration with inclusive sludge blanket clarification and internal sludge recycle.

DESCRIPTION OF THE INVENTION

My invention relates generally to methods and apparatus for the biochemical treatment of waste materials.

More particularly my invention concerns a compact aerobic treatment unit utilizing annular flow, positive mixing aeration with inclusive sludge blanket clarification and internal sludge recycle.

Increased emphasis has recently been placed on the development of methods and apparatus for the treatment of domestic and/or industrial wastes containing pollutional materials, hereinafter referred to collectively as sewage. While the rate at which these pollutants are generated is ever increasing, the absolute necessity for maintaining our water courses pollution-free is being recognized and requires the removal of the contaminants from effluents returned to our lakes and streams.

The two most widely used indicia of water quality are B.O.D. (biochemical oxygen demand) and suspended solids. Ideally the waste treatment effluent will have both of these factors reduced to a level no higher than the receiving body of water. B.O.D. refers to the oxygen required for biodegradation, while suspended solids measures particulate matter carried by the waste water. Through the use of my invention I believe that reductions of B.O.D. and suspended solids in the range of from 70% to 98% may be readily obtained.

Broadly speaking, waste treatments may be classified as anarobic or aerobic. The former involve long term, closed system biochemical action accompanied by the generation of malodorous gases such as $H_2S$. Their utility is, therefore, primarily in low capacity units such as for boats, trailers, septic tanks, etc. Aerobic treatments, on the other hand, involve high rate oxidation of the waste through its exposure to living aerobic microorganisms in an environment favorable for decomposition of the B.O.D. Aerobic biological treatments are principally either of the trickling filter type or the activated sludge type. By the trickling filter method, sewage is allowed to trickle down through a bed of broken stone, clinkers, slate or synthetic plastic media carrying biologic slimes on its surfaces which oxidize to some degree the organic content. In the activated sludge method, the sewage is usually agitated in the presence of air so that the biological life develops and gradually builds up to larger flocs of suspended solids and microbial cells known as activated sludge. In both cases aerobic microorganisms act on and decompose organic waste materials, the final end products being $CO_2$, $H_2O$, and biological cell material. My invention provides an improved activated sludge aerobic biological treatment system.

A drawback of the aerobic systems, in general, is the high quantity of air required. If the contents are not continuously mixed or agitated in the presence of oxygen, the microorganisms become inactive, and anarobic conditions will eventually develop with the aforementioned malodorous and oxidation retarding effects. Therefore, very large surface areas may be required for sufficient air contact depending on the quantity of waste being treated and the particular oxidation method used.

It is a primary object of my invention to provide a very efficient activated sludge treatment system that is particularly compact and yet may be designed for high capacity.

Other objects and advantages of my invention will become apparent to those skilled in this art upon reference to the detailed description below and to the drawings, in which, FIG. 1 is a perspective view of an aerobic waste treatment arrangement in accordance with my invention;

Conventional activated sludge system usually comprise a settling tank, aeration unit, clarifier, and sludge recycle. In my improved arrangement, these components are integrated in a single, highly efficient unit. Furthermore, a troublesome task inherent in the use of known systems involves the periodic removal of accumulated sludge from improperly mixed or underpowered aeration basins. The sludge builds up on the bottom of the basin or container, and its removal frequently requires that the entire system be closed down. This necessitates a holding tank or cessation of the operation of the waste-generating process unless an alternate treatment facility is available. In contradistinction, my improved system allows complete solids suspension at very low power inputs by periodically scouring the aeration tank bottom by the rotating ejector bank(s).

Turning now to the drawings, it will be appreciated that there are illustrated therein specific embodiments of my invention. Other modifications will suggest themselves to one skilled in this art and are intended to form a part of my invention insofar as permitted by interpretation of the claims which conclude this disclosure.

Figure 1:
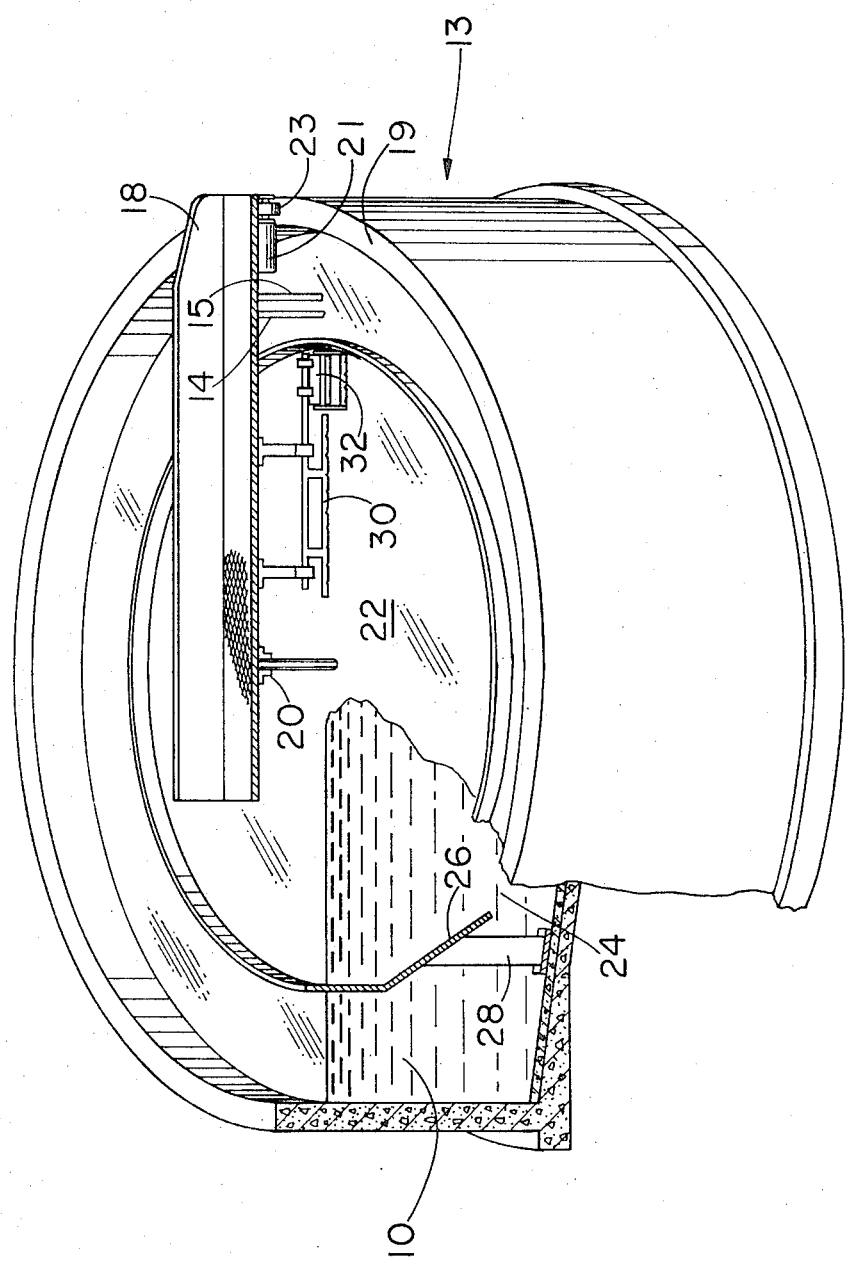

As shown in FIG. 1, my treatment system 13 preferably comprises a circular channel configuration interconnected to a clarifier situated within the ring formed by the channel. As may be understood more fully by reference to FIGS. 2 and 3, the sewage 11 first enters annular channel 10 at point 12. Compressed air is introduced from compressor 46 under pressure preferably about equal to the hydrostatic head on the submerged ejectors 16 through conduit 14 to ejectors 16. These ejectors 16 are connected to pump 44 through conduit 15 and supported within channel 10 by a suitable device such as arm or bridge 18 which also may house conduit 14. The arm 18 is rotatably mounted on turret 20 and supported on rim 19 by wheel 23 which may be driven by a conventional power source such as motor 21. Alternatively, power for rotating the bridge 18 about turret 20 may be derived wholly or partly from the reactive force of air and water from ejectors 16 which also impart momentum to the waste material 11 within the channel.

Figure 3:
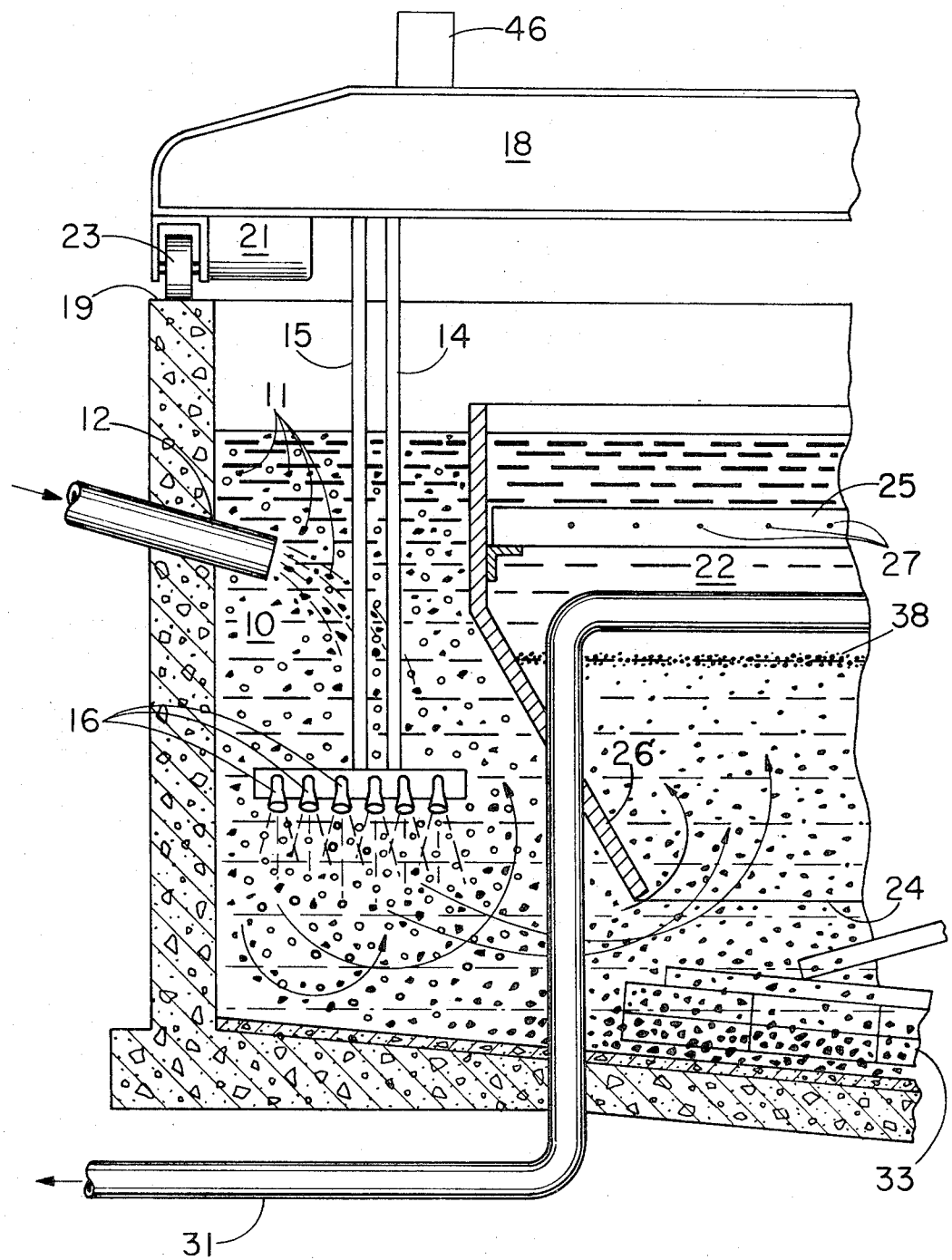
FIG. 3 is a partial detailed view of my system in operation showing the solids distribution.

Completely surrounded by channel 10 is clarifier 22 which is frustum-shaped and open at both ends with the smaller opening 24 adjacent the bottom of channel 10. Conical baffle 26 separates channel 10 from clarifier 22 and is supported by a set of radial baffles 28. In this manner flow to the clarifier is properly distributed. Clarifier rake 33 and skimmer 32 are rotatably mounted on turret 20 to provide waste sludge raking and skimming of any surface accumulation. Conduit 34 provides for removal of skimmings from the top of the clarifier or recycle to channel 10 while conduit 36 is connected to a pump (not shown) for the removal of sludge to be wasted from the bottom of clarifier 22. The predominant amount of the sludge, however, as shown best in FIG. 3, is returned to channel 10 from clarifier 22 through opening 24 as a result of the density gradients created by sludge piling up in the clarifier and forcing sludge into the channel where it is picked up by the circular, spiral flow pattern.

Figure 2:
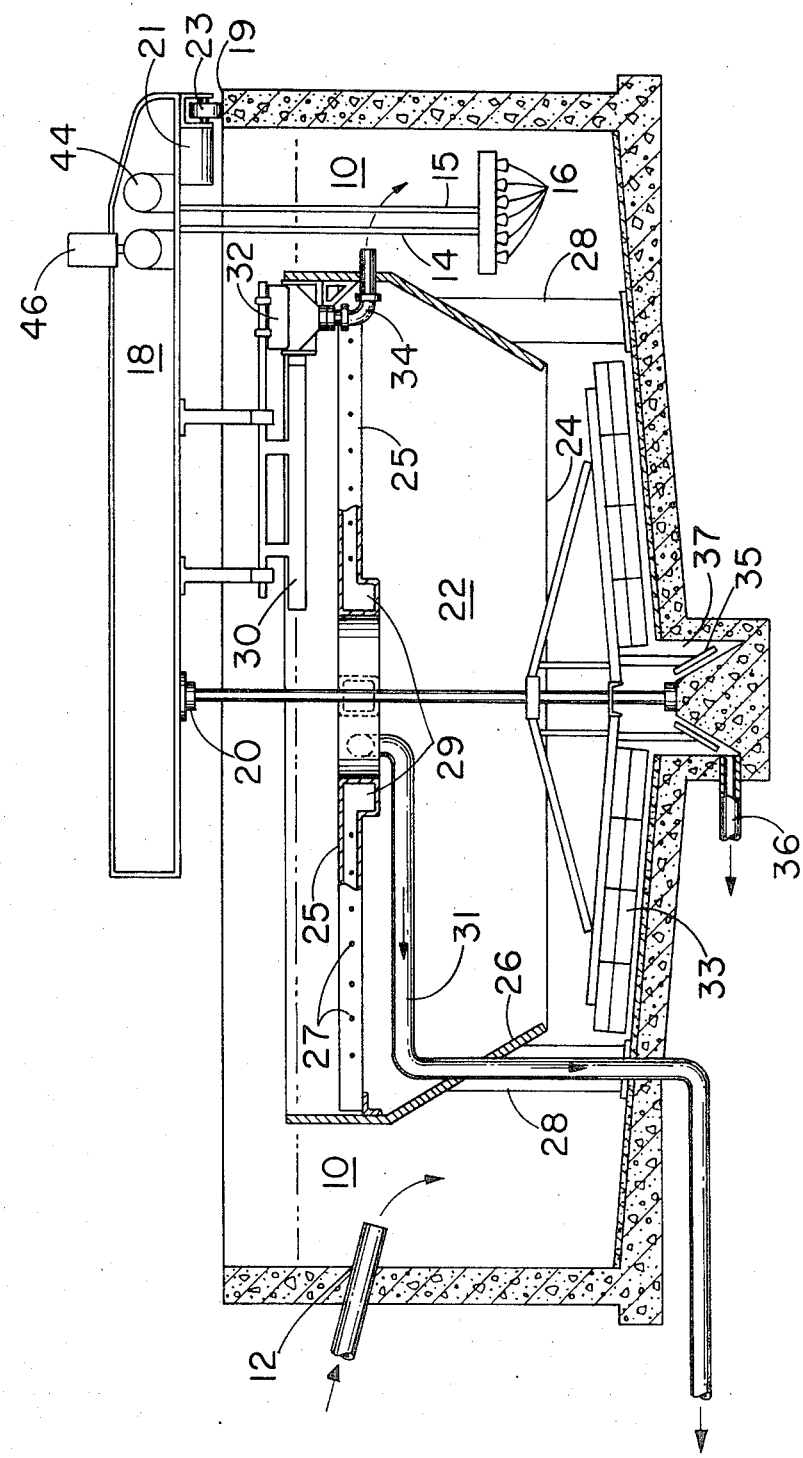
FIG. 2 is a sectional side view of the apparatus of FIG. 1.

Although only one bank of ejectors 16 is shown in FIG. 2 it will be understood that the total number of ejectors required depends upon the quantity and characteristics of the waste being treated. Preferably the ejectors serve in a double capacity. First, they provide air which serves as a source of oxygen for the oxidative process discussed earlier. Secondly, they provide the motive force to maintain the liquid waste in motion to prevent the suspended solids from settling out in channel 10. Since the liquid in channel 10 undergoes periodic agitation as the ejectors 16 rotate, the overall liquid velocity around the channel may be at a very low rate, e.g. substantially less than 1 ft./sec.

In operation, the channel contents will continually turn over in a circular, spiral flow pattern due to secondary currents induced by changes in fluid momentum as the flow moves around the circular channel and piles up at the outer channel wall. Mixed liquor will flow under conical baffle 26 and up through a sludge blanket 38 (FIG. 3) formed in the clarifier 22 while settled sludge will be forced back into the channel 10 through the combined actions of density gradients and the spiral flow pattern. Large scraper 33 is of conventional rotating design which is commonly used to prevent sludge build-up. The sludge blanket 38 removes suspended solids which interact with and become a part of the biomass. Sludge settling to the bottom of the clarifier is recycled under baffle 26 or partially pumped out and wasted by means of paddle scraper 35 and conduit 36 from center channel 37. In general, the amount of sludge to be wasted is very low and the great majority of it remains in the system. This assures that the level of microorganism growth is sufficient to treat the added waste material.

The clarified liquid is preferably removed through a plurality of radial launderers 25. These consist of conduits with small openings 27 submerged at some point above sludge blanket 38. These conduits draw the liquid into a central annular ring 29 from which it flows out through pipe 31.

Figure 4:
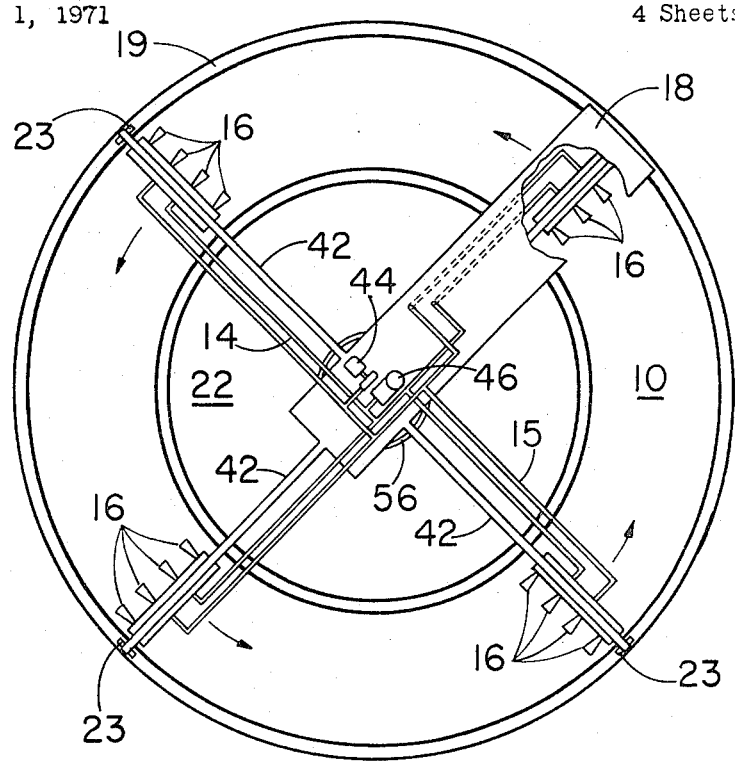
FIG. 4 is a top view of a similar arrangement having a plurality of ejector banks.

The exact location of ejectors 16 depends upon two primary considerations. For maximum bubble contact time and oxidation effect, the ejectors should be positioned as low as possible in channel 10. However, compressor power economy may dictate a more central depth location. In fact, by placing the ejectors near the liquid surface and opening them to the atmosphere, the need for blowers may be avoided entirely. In this arrangement, as the liquid is pumped through the ejectors a vacuum will be created drawing air into intimate mixture with the liquid in the ejectors. If necessary, the bubble contact time may be increased by canting the ejectors at a downward angle. This type of arrangement is discussed more fully in my copending application Ser. No. 75,619, filed Sept. 25, 1970, and assigned to the assignee of the present invention. While FIG. 2 shows the ejectors supported by bridge 18, any suitable structure may be used such as, for example, floats, pontoons, etc. Where several banks of ejectors 16 are used, as shown in FIG. 4, I prefer to position each bank at equal angles with respect to the other banks and the center of the circle formed by channel 10 for uniformity of treatment of channel contents 11. Outer rail or rim 19 is provided for guiding the bank supports 42 and wheels 23 in rotational movement. For convenience pump 44 and blower 46 may be centrally located as shown so as to reduce piping costs and pressure drop. Also when employing this arrangement I prefer to use a central sump (indicated generally as 56) to receive the influent which is then pumped through ejectors to channel 10 in a conventional manner.

Figure 5:
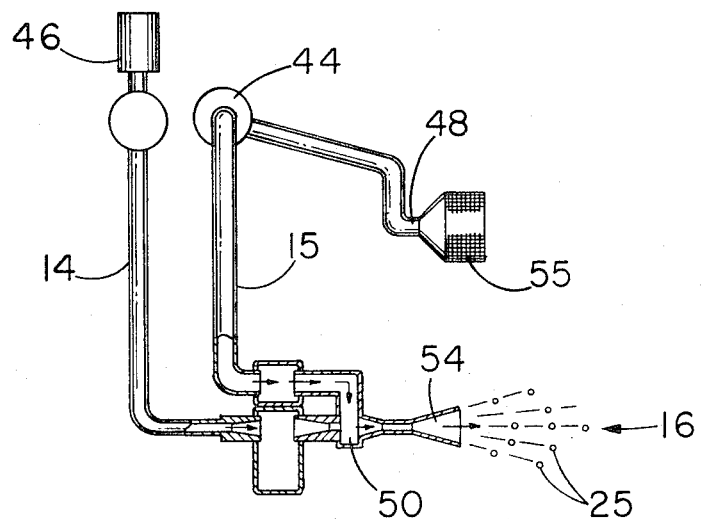
FIG. 5 illustrates an ejector piping arrangement suitable for use with my invention.

Examples of ejectors which may be used include those manufactured by Schute and Koerting Co. or by Penberthy, a division of Houdaille Industries, Inc. which are illustrated schematically in FIG. 5. These ejectors are conventional devices commonly referred to also as aeration eductors or aeration jets and consist generally of an inlet 48 to an internal mixing chamber 50, air inlet 14, and discharge nozzle 54. Screen 55 prevents larger solids from plugging the system. The air is mixed with the waste liquor in the mixing chamber where a minor part of the oxygen transfer takes place. The balance occurs substantially as the small bubbles 25 discharged from the jet circulate in the aeration channel.

Standard low pressure water pumps and compressors are readily available and can be selected in accordance with design requirements such as horsepower and air capacity. It is preferred that the piping be manufactured from rigid plastics such as high density polyethylene, fiber glass reinforced pipes, or polyvinyl chloride; however, other materials including stainless steel or black iron may be used depending upon the corrosiveness of the sewage being treated and other considerations.

While the use of air has been specifically recited as the oxidizing gas, other oxygen-rich gases as well as pure oxygen may be utilized. For my purposes however, air has usually been selected for reasons of economy.

My invention as described above provides a highly efficient mixing channel with a low energy expenditure. At the same time it insures that solids do not deposit anywhere in the aeration basin. In combination with the internal clarifier, uniform flow distribution is achieved to the sludge blanket without sludge pumping except to remove that portion to be wasted. The result is a high capacity waste treatment facility that is extremely compact and yet capable of reductions in both B.O.D. and suspended solids of 90% or more.

I claim:

1. Method of treating sewage-containing liquid to reduce B.O.D. and suspended solids comprising the steps of,
    introducing an oxygen-rich gas into said liquid to periodically agitate said liquid within an aeration zone and to cause said liquid to move circuitously within said areation zone about a baffle;
    passing a portion of said sewage under said baffle into a central clarifying zone;
    allowing sludge to settle within said central clarifying zone leaving the liquid above said sludge substantially free of suspended solids;
    removing clarified liquid from above said sludge, and
    returning at least a portion of said settled sludge under said baffle to said circuitously moving liquid.

2. The method of claim 1 wherein said oxygen-rich gas is air.

3. The method of claim 1 including the additional step of wasting a portion of said settled sludge.

4. The method of claim 1 wherein said oxygen-rich gas is introduced through one or more ejectors.

5. The method of claim 4 wherein activated sludge is introduced along with said oxygen-rich gas.

6. Apparatus for treating sewage-containing liquid to reduce B.O.D. and suspended solids including an internal sludge recycle comprising:
    an annular channel for receiving said sewage-containing liquid;
    means for introducing said sewage-containing liquid into said channel;
    means for introducing an oxygen-rich gas below the surface of said sewage-containing liquid within said channel for periodically agitating and imparting circular, spiral motion to said sewage-containing liquid;
    a frustum-shaped clarification zone within the center portion of the circle defined by said annular channel and having a wall baffle portion in common therewith, said wall portion being open at the bottom for the mutual transfer of waste from the channel to the clarification zone and sludge from the clarification zone to the channel; and means for withdrawing clarified liquid from the upper portion of said clarification zone.

7. Apparatus of claim 6 further including means for withdrawing and wasting sludge from the bottom of said clarification zone.

8. Apparatus of claim 6 wherein said gas introduction means comprises a plurality of ejectors.

9. Apparatus of claim 8 wherein said ejectors comprise a plurality of rotatable banks.

10. Apparatus of claim 8 wherein said ejectors are adapted to introduce activated sludge along with said gas.

References Cited

UNITED STATES PATENTS

| | | | |
|---|---|---|---|
| 2,597,802 | 5/1952 | Kappe | 210—197 |
| 3,051,315 | 8/1962 | Boester | 210—195 |
| 3,533,508 | 10/1970 | Seipp et al. | 210—195 |
| 3,448,861 | 6/1969 | Berk | 210—256 X |
| 3,495,712 | 2/1970 | Schreiber | 210—220 |

MICHAEL ROGERS, Primary Examiner

U.S. Cl. X.R.

210—14, 195, 220, 256, 512